United States Patent [19]
Mori

[11] Patent Number: 5,608,664
[45] Date of Patent: Mar. 4, 1997

[54] METHOD FOR CORRELATING IMAGE DATA OF A RANGE-FINDER

[75] Inventor: Kenichi Mori, Nagano, Japan

[73] Assignee: Fuji Electric Co., Ltd., Kawasaki, Japan

[21] Appl. No.: 313,733

[22] Filed: Sep. 27, 1994

[30]     Foreign Application Priority Data

Sep. 28, 1993  [JP]  Japan .................................. 5-240219

[51] Int. Cl.$^6$ ....................................................... G06E 3/00
[52] U.S. Cl. ................................................................ 364/822
[58] Field of Search ........................... 364/822; 348/345, 348/348, 349, 350; 354/400, 402, 403

[56]         References Cited

U.S. PATENT DOCUMENTS 5,068,738  11/1991  Miida ...................................... 348/345

5,477,382  12/1995  Pernick ............................... 364/822 X

*Primary Examiner*—Tan V. Mai
*Attorney, Agent, or Firm*—Morrison Law Firm

[57]          ABSTRACT

Corrective data for left and right sensor arrays of a range-finding optical system is stored as a difference between a maximum sensor output and a correction function. The stored data is taken while imaging a blank white target area. In use, the corrective data is added to outputs of each sensor. This technique reduces the number of storage bits required per sensor, and permits improved correlation. The reduction in storage bits permits a reduction in chip size. Differences in sensitivities of right and left sensor arrays are not corrected independently. Instead, the two sets of corrective data enhance the similarity between counted value rows from the right and left sensor arrays.

8 Claims, 6 Drawing Sheets ial Field

METHOD FOR CORRELATING IMAGE DATA OF A RANGE-FINDER

INDUSTRIAL FIELD

The present invention relates to a range-finding system applicable to an automatic focusing device used in a camera or the like and, more particularly, to a circuit for correcting variations in sensitivity of sensor arrays.

BACKGROUND

Referring to FIG. 3, a conventional range-finding system 100 uses triangulation based on reflected external light. Range-finding system 100 is installed in an autofocus camera. A focusing optical system, shown generally at 1, focuses light on a distance-measuring semiconductor integrated circuit 5 (hereinafter IC 5). Focusing optical system 1 includes pair of lenses made up of a right focusing lens 1R and a left focusing lens 1L. Lenses 1R and 1L face a subject T to be imaged. A distance between lenses 1R and 1L produces a parallax. IC 5 includes a right photosensor arrays 2R, upon which light from right lens 1R is imaged, and a left photosensor array 2L upon which light from left lens 1L is imaged. Photosensor arrays convert images of the subject T into analog electrical signals. Right and left quantizing circuits 3R and 3L quantize signals from individual sensors of the photosensor arrays 2R and 2L, respectively. A logic portion 4 calculates a distance signal based on the quantized signals.

Referring now to FIG. 4, the subject T is imaged by the left focusing lens 1L and the right focusing lens 1R. Axes 11 and 12 of left focusing lens 1L and right focusing lens 1R are spaced apart a reference length B. Separate images R and L of the subject T are produced on the photosensor arrays 2R and 2L, respectively, corresponding to a focal plane. The images R and L are inverted real images. Based on the principle of triangulation, or analogy of triangles, the distance d to the subject T is given by $$d = B \cdot f_e/(X_1+X_2) = B \cdot f_e/X \quad (1)$$

where: $f_e$ is the distance between the focusing lenses 1R and 1L and the photosensor arrays 2R and 2L, respectively, or the focal distance of the focusing lenses 1R and 1L, X1 and X2 are the distances between the image points $P_1$ and $P_2$ of an object point P within the subject and the optical axes $1_1$ and $1_2$ of the focusing lenses 1L and 1R, respectively.

The sum X of $X_1$ and $X_2$ is a relative deviation amount, or the phase difference, between the subject images. The distance d can be found by measuring this spatial phase difference X. Distance-measuring semiconductor integrated circuit 5 uses a function for evaluating the correlation between the subject images, and finds the phase difference X in the form of the number of pitches of the sensors of the photosensors by searching for a zone in which the same subject image is obtained on the photosensor arrays 2R and 2L.

Referring now also to FIG. 5(a), left and right photosensor arrays 2L and 2R each consists of an array of photodiodes D. A photocurrent i flowing through a photodiode D varies in response to the intensity of impinging light. The photocurrent i is integrated in the junction capacitance C of the photodiode D. The integrated potential Q is fed to an input of a threshold circuit COM. Tr is an insulated-gated field-effect transistor which discharges the junction capacitance C in response to a reset signal, thereby resetting the sensor.

Referring now also to FIG. 5(b), when the integrated potential Q exceeds a threshold value $V_{th}$, then the output S from the threshold circuit COM is inverted. That is, the intensity of light received by the photodiode D is transformed into a corresponding response time $t_s$ of the output S. As the intensity of the received light increases, the response time $t_s$ shortens.

Referring now to FIG. 6, quantizing circuit 3 in distance-measuring semiconductor integrated circuit 5 includes a clock generator circuit 3a for generating a clock signal CK. Clock signal CK is fed to an input of a counter 3b which may be, for example, an 8-bit counter. Latch portion 3c is equipped with n latch circuits corresponding to the n sensors of the photosensor array 2. The latch circuits latch the total count of the counter 3b while using their respective outputs $S_1$–$S_n$ from the sensors as strobe signals. Count values $L_1$–$L_n$, or quantized values, held by the latch circuits, are serially transmitted to an output line $O_{L1}$ in response to a selecting signal produced from a decoder 3d. Corrective data $C_1$–$C_n$ about variations in sensitivity of the individual photosensors of the photosensor array are stored in a PROM 3e. Corrective data $C_1$–$C_n$ is serially transferred to an output line $O_{L2}$ in response to a selecting signal from the decoder 3d. A subtracter circuit 3f produces the differences between counted values $L_1$–$L_n$ from the sensors and their respective corrective data $C_1$–$C_n$. The differences, representing received light energy, corrected for differences in detector sensitivity, is serially transmitted as $N_1$–$N_n$ signals to logic portion 4.

The meanings of the data $C_1$–$C_n$ about correction of variations in sensitivity of the sensors are described now. In the above-described range-finding system, the sensitivities of the n sensors vary from each other due to inevitable manufacturing tolerances. The distribution of the variations differs from chip to chip of distance-measuring semiconductor integrated circuit 5. In principle, assuming that a blank white test pattern having no contrast is a subject, a subject image having no contrast should be focused onto the photosensor 2. Any differences in the outputs from sensor to sensor, under this condition, must be due to differences in the sensitivities of the sensors, and not to variations in the scene being imaged. Outputs $S_1$–$S_n$ from the sensors all should have the uniform response time $t_s$. The counted values $L_1$–$L_n$ held by the latch circuits of the latch portion 3c should be equal to each other.

In practice, however, variations in the characteristics of the devices forming the sensors due to manufacturing tolerances or errors from variations in net sensitivity of device characteristics of the sensors are superimposed on nonuniformity, or principle error, of the distribution of the amount of light of image focused by the focusing optical system 1. Consequently, even when imaging a blank white scene, the counted values $L_1$–$L_n$ differ from each other. More specifically, the intensity of received light, or the illuminance, varies across the image according to the $\cos^4$ in dependence on the displacement of objects from the optical axis on the focal plane (photosensor array 2) of the focusing lens 1. Accordingly, the counted values $L_1$–$L_n$ obtained by the latch circuits do not show a uniform distribution due to the $\cos^4$ rule but rather lie on a curve given by $1/\cos^4(i)$, as indicated by A in FIG. 7. It is noted that i indicates a sensor address.

Manufacturing errors generally take place at random. The resulting sensitivity variations can be schematically represented by a random curve B shown in FIG. 7. In consequence, the counted values $L_1$–$L_n$ lie on a curve C which is obtained by combining curves A and B.

Returning now to FIG. 6, as a technique for correcting the sensitivity variations combined in this way, a correcting circuit (PROM $3e$ and subtracter circuit $3f$) is used. After assembly of the range-finding system, each finished product is tested by imaging the aforementioned blank white test pattern. The counted values $L_1$–$L_n$ produced from the chips are written to the PROM $3e$ by a PROM writer as corrective data $C_1$–$C_n$.

In operation for measuring the distance, the actually measured values $L_1$–$L_n$ are obtained from focused images of the subject having contrast. Subtracter circuit $3f$ produces the differences between the $L_1$–$L_n$ and the corrective data $C_1$–$C_n$. The resulting difference values are serially transmitted as corrected counted values $N_1$–$N_n$ from the quantizing circuit 3 to the logic portion 4.

The above-described correcting circuit has the following problems. If the resolution at which the distance is measured is improved, then the number of sensor cells of the photosensor array 2, must be increased in order to accommodate the smaller scene increment being sensed by each sensor cell. This increases the number of bits per item of the corrective data $C_1$–$C_n$ and the number of data items. For example, in the case of the photosensor 2 having 178 sensors, a storage space of 4 bits is needed per centimeter today. A right sensor array 2R and a left sensor array 2L are needed per chip. Therefore, the area occupied by the PROM $3e$ is large. Large chip areas are well-known causes of decreases in the manufacturing yield in a semiconductor fabrication process.

OBJECTS AND SUMMARY OF THE INVENTION

In view of the foregoing problems, it is an object of the present invention to provide a range-finding system in which bits stored for use as corrective data can be reduced to thereby enable a reduction in the chip size. The corrective data is created so as to enhance the similarity between right and left quantized value rows without correcting the sensitivity variations in right and left sensor arrays independently.

It is further object of the invention to provide a correction method for outputs of sensor arrays that reduces the storage requirements for correction data.

it is a further object of the invention to provide a correction method for outputs of sensor array wherein correction data is added to quantized sensor output.

Briefly stated, the present invention provides corrective data for left and right sensor arrays of a range-finding optical system consisting of a difference between a maximum sensor output and a correction function. The stored data is taken while imaging a blank white target area. In use, the corrective data is added to outputs of each sensor. This technique reduces the number of storage bits required per sensor, and permits improved correlation. The reduction in storage bits permits a reduction in chip size. Differences in sensitivities of right and left sensor arrays are not corrected independently. Instead, the two sets of corrective data enhance the similarity between counted value rows from the right and left sensor arrays.

According to an embodiment of the invention, there is provided a method for calculating a correlation between signals from left and right sensor arrays comprising: producing quantized left outputs from the left sensor array while imaging a blank scene, producing quantized right outputs from the right sensor array while imaging a blank scene, approximating the quantized left outputs to produce a right approximate curve of the form $y_1=a_1x^2+b_1$, approximating the quantized right outputs to produce a right approximate curve of the form $y_2=a_2x^2+b_2$, ignoring coefficients $b_1$ and $b_2$ and calculating coefficients $a_1$ and $a_2$, calculate an average approximation quadratic curve from $(a_1+a_2)x^2/2$, calculate first differential values between the left quantized values and the average approximation quadratic curve, calculate right differential values between the right quantized values and the average approximation quadratic curve, find a left maximum of the left differential values, find a right maximum of the right differential values, calculate a set of new left differential values by subtracting the left differential values from the left maximum, calculate a set of new right differential values by subtracting the right differential values from the right maximum, adding the new left differential values to the quantized left outputs to produce a corrected left sensor array output, and adding the new right differential values to the quantized right outputs to produce a corrected right sensor array output.

According to a feature of the invention, there is provided a method for calculating a correlation between signals from left and right sensor arrays comprising: producing quantized left outputs from the left sensor array while imaging a blank scene, producing quantized right outputs from the right sensor array while imaging a blank scene, approximating the quantized left outputs to produce a right approximate curve of the form $y_1=a_1\cos^4 x+b_1$, approximating the quantized right outputs to produce a right approximate curve of the form $y_2=a_2\cos^4 x+b_2$, ignoring coefficients $b_1$ and $b_2$ and calculating coefficients $a_1$ and $a_2$, calculate an average approximation curve from $(a_1+a_2)\cos^4 x/2$, calculate first differential values between the left quantized values and the average approximation curve, calculate right differential values between the right quantized values and the average approximation curve, find a left maximum of the left differential values, find a right maximum of the right differential values, calculate a set of new left differential values by subtracting the left differential values from the left maximum, calculate a set of new right differential values by subtracting the right differential values from the right maximum, adding the new left differential values to the quantized left outputs to produce a corrected left sensor array output, and adding the new right differential values to the quantized right outputs to produce a corrected right sensor array output.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
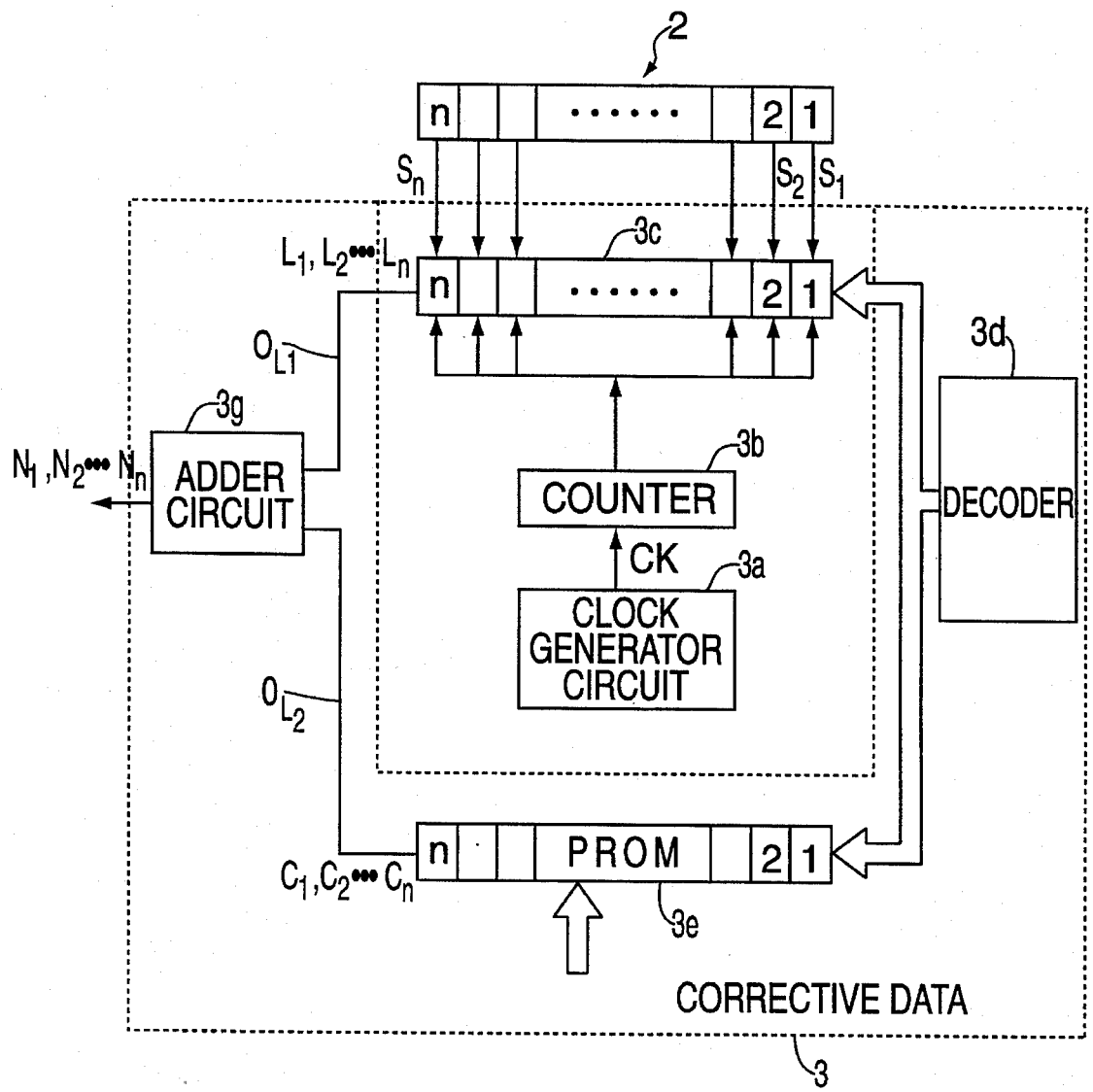
FIG. 1 is a block diagram showing main portions of a distance-measuring semiconductor integrated circuit in a range-finding system according to an embodiment of the invention.

The above objects are achieved in accordance with the teachings of the invention by providing a range-finding system having right and left imaging lenses making a pair, a first left sensor array and a second right sensor array which make a pair and on which images of a subject are focused by the right and left imaging lenses, respectively, to permit distance between the subject and the system to be measured, a first and a second quantizing portions corresponding to the first and second sensor arrays, respectively, and acting to quantize outputs from the sensors, to convert the outputs into quantized values, and to convert the quantized values into corrected quantized values which have been corrected for variations in sensitivity of the sensors, and a logic portion for evaluating correlation between the corrected quantized values in a given zone of sensor addresses according to rows of quantized values from the first and second quantizing portions and for obtaining a distance signal. The first and second quantizing portions have correcting means comprising a corrective data storage means for storing data corrected for the variations in sensitivity of the sensors for each sensor address and an adder means for summing up corrected data at sensor addresses corresponding to the quantized values to create the corrected quantized values. This system is characterized in that the following corrective data have been established. Rounded differences $\Delta_{1i}$ and $\Delta_{2i}$ are established as the corrective data. The rounded differences $\Delta_{1i}$ and $\Delta_{2i}$ is obtained by imaging a blank white test pattern as the subject, obtaining a distribution $(x_{1i}, y_{1i})$ of actual measurements of quantized values from the first sensor array and a distribution $(x_{2i}, y_{2i})$ of actual measurements of quantized values from the second sensor array, approximating the distributions $(x_{1i}, y_{1i})$ and $(x_{2i}, y_{2i})$ by quadratic curves $y=a_1x^2+b_1$ and $y=a_2x^2+b_2$, respectively, by a method of least squares, finding coefficients $a_1$ and $a_2$, calculating a difference between the distribution $(x_{1i}, y_{1i})$ of the actual measurements and an average approximate quadratic curve $y=(a_1+a_2)x^2/2$ and a difference between the distribution $(x_{2i}, y_{2i})$ of the actual measurements and the average approximate quadratic curve $y=(a_1+a_2)x^2/2$ to thereby calculate differential values $\{y_{1i}-(a_1+a_2)x_{1i}^2/2\}$ and $\{y_{2i}-(a_1+a_2)x_{2i}^2/2\}$, finding maximum values $max_1$ and $max_2$ of these differential values, respectively, calculating a difference between the maximum value $max_1$ and the former differential value and a difference between the maximum value $max_2$ and the latter differential value to create new differential values $\Delta_{1i}=[max_1-\{y_{1i}-(a_1+a_2)x_{1i}^2/2\}]$ and $\Delta_{2i}=[max_2-\{y_{2i}-(a_1+a_2)x_{2i}^2/2\}]$, and rounding off there new differential values (i.e., counting fractions of 5 and over as a unit and disregarding the rest), thus producing the rounded differences $\Delta_{1i}$ and $\Delta_{2i}$, where $x_{1i}$ and $x_{2i}$ are sensor addresses, $y_{1i}$ and $y_{2i}$ are quantized values, and $a_1$, $a_2$, $b_1$, and $b_2$ are coefficients.

Other corrective data is established by using approximate curves $y=a_1 \cos^4 x+b_1$ and $y=a_2 \cos^4 x+b_2$ instead of the quadratic approximate curves $y=a_1x^2+b_1$ and $y=a_2x^2+b_2$.

After assembly of the range-finding system, each finished product is tested. In each testing step, quantized values of the test are produced from the quantizing portion, using a blank test pattern. In the distributions $(x_{1i}, y_{1i})$ and $(x_{2i}, y_{2i})$ of actual measurements of the quantized values of the test, variations in net sensitivity of the sensors are superimposed on the distributions of the focusing lenses obeying the $\cos^4$ law. Let $(x_{1i}, y_{1i})$ be the distributed points. Then, the method of least squares is applied to the distributions $(x_{1i}, y_{1i})$ and $(x_{2i}, y_{2i})$ of actual measurements. Approximate quadratic curves $y=a_1x^2+b_1$ and $y=a_2x^2+b_2$ are found, where x is a sensor address, y is a quantized value, and $a_1$, $a_2$, $b_1$, and $b_2$ are coefficient,. The coefficients $b_1$ and $b_2$ correspond to offset amounts in the case of sensors. In the present case, the outputs from the sensors are quantized, using the greatest sensor output as a reference. Thus the offsets $b_1$ and $b_2$ are immaterial, and are therefore ignored. In this way, approximate curves $y=a_1x^2$ and $y=a_2x^2$ are obtained. The approximate curves $y=a_1x^2$ and $y=a_2x^2$ generally reflect states in which variations in net sensitivity of the photosensors are superimposed on the distributions of the focusing lenses obeying the $\cos^4$ law. Then, the arithmetical mean $(a_1+a_2)/2$ is computed from the coefficients $a_1$ and $a_2$ of the right and left approximate curves. An average approximate quadratic curve $y=(a_1+a_2)x^2/2$ is created.

The reason the neutral average approximate curve is obtained from the approximate curves reflecting the variations in the right and left sensor sensitivities is as follows. The logic portion in the succeeding stage relies on a distance measurement in which a zone in right and left focused images agree in correlation, the phase difference between the right and left focused images is found, and the distance is determined. Therefore, the distributions of corrected quantized values are not required to agree with each other completely. Rather, it is only necessary that a sufficient similarity be found between the distribution curves. Accordingly, although local or microscopic similarity is not assured, an average curve of the approximate curves is so found that similarity is secured between the two sets of sensor addresses. In the past, quantized values have been corrected according to two independent sets of variation-corrected data about the right and left sensors, respectively. Therefore, in the stage preceding the logic portion, the correlation is not corrected. In the present invention, the correlation between the right and left portions is corrected. Hence, the evaluation of the correlation in the logic portion produces not local correction but coincidence of correlation over a wide zone. In consequence, accurate distance-measuring performance is accomplished.

Then, differential values $\{y_{1i}-(a_1+a_2)x_{1i}^2/2\}$ and $\{y_{2i}-(a_1+a_2)x_{2i}^2/2\}$ are taken. Their maximum values $max_1$ and $max_2$ are found. The differences between the maximum values $max_1$ and $max_2$ and their respective differential values are taken, thus creating new differential values $\Delta_{1i}=[max_1-\{y_{1i}-(a_1+a_2)x_{1i}^2/2\}]$ and $\Delta_{2i}=[max_2-\{y_{2i}-(a_1+a_2)x_{2i}^2/2\}]$. These new differential values are rounded off, i.e., fractions of 5 and over are counted as a unit and the rest is disregarded. In this way, corrected data $\Delta_{1i}$ and $\Delta_{2i}$ are established. The number of bits of the corrected data is fewer than in the case where differential value distributions are used directly.

Therefore, the storage space in the corrective data storage means is compressed, and the chip size is reduced.

Since the effect of the $\cos^4$ law of counted number rows is due to principle error, it is better to apply the method of least squares using approximate curves $y=a_1 \cos^4 x+b_1$ and $y=a_2 \cos^4 x+b_2$ than to apply the method of least squares using the quadratic approximate curves $y=a_1x^2+b_1$ and $y=a_2x^2+b_2$, because the coincidence of the distributions of the right and left corrected quantized values (neglecting offset amounts) is improved further.

Referring to FIG. 1, a photosensor array 2 of right and left photosensor arrays in a distance-measuring semiconductor integrated circuit feeds signals $s_1$ through $s_n$ to inputs of corresponding latch circuits 1–n of a latch portion 3c of a quantizing circuit 3 of a distance-measuring semiconductor integrated circuit (the remainder of which is not shown). As in the prior-art embodiment of FIG. 6, a clock generator circuit 3a feeds clock pulses CK to an input of an 8-bit counter 3b.

Figure 5A:
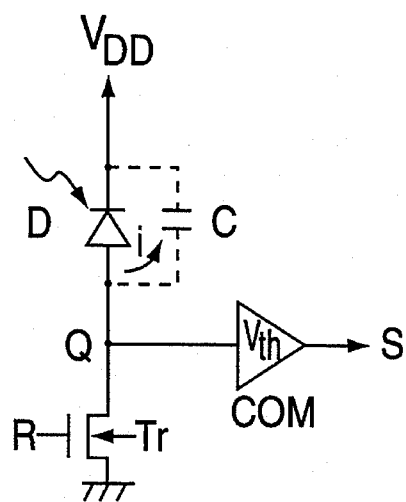
FIG. 5($a$) is a circuit diagram of the structure of one sensor portion of an IC for autofocus action.
FIG. 5(b) is a timing chart of signals, illustrating the operation of the sensor portion.
Figure 5B:
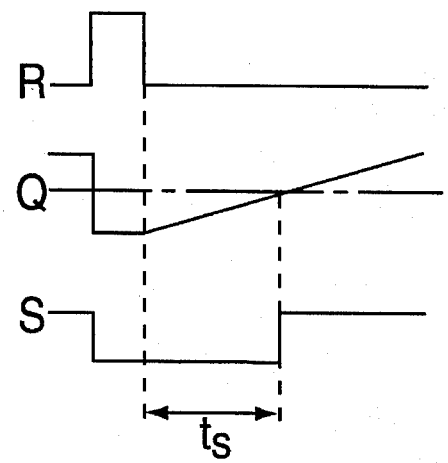

Referring momentarily also to FIG. 5(b), each latch circuit 1–n counts clock pulses CK during the period $t_s$ following the end of the reset pulse R. As previously noted, the period $t_s$ varies with the intensity of the luminous flux impinging one a particular photosensor. Thus, the outputs $S_1$–$S_n$ are used as strobe signals to control individual latch circuits 1–n. The number of clock pulses CK that are counted during each cycle is proportional to the intensity of the luminous flux on the photosensor. As a consequence, at the end of a cycle, the entire array of latch circuits 1–n contains numbers whose magnitudes represent the luminous flux incident on corresponding elements of its photosensor array. Count values $L_1$–$L_n$, or quantized values, held by the latch circuits are serially transmitted to an output line $O_{L1}$ in response to a selecting signal produced from a decoder 3d. Data $C_1$–$C_n$ about correction of variations in sensitivity of the sensors of the corresponding chip are stored in a PROM 3e and serially transferred to an output line $O_{L2}$ in response to a selecting signal produced from the decoder 3d. An adder circuit 3g adds total counts $L_1$–$L_n$ of the sensors to corresponding corrective data $C_1$–$C_n$ and serially transmits the resulting corrected counted values (corrected quantized values) $N_1$–$N_n$ as quantized signals to the logic portion 4.

Figure 6:
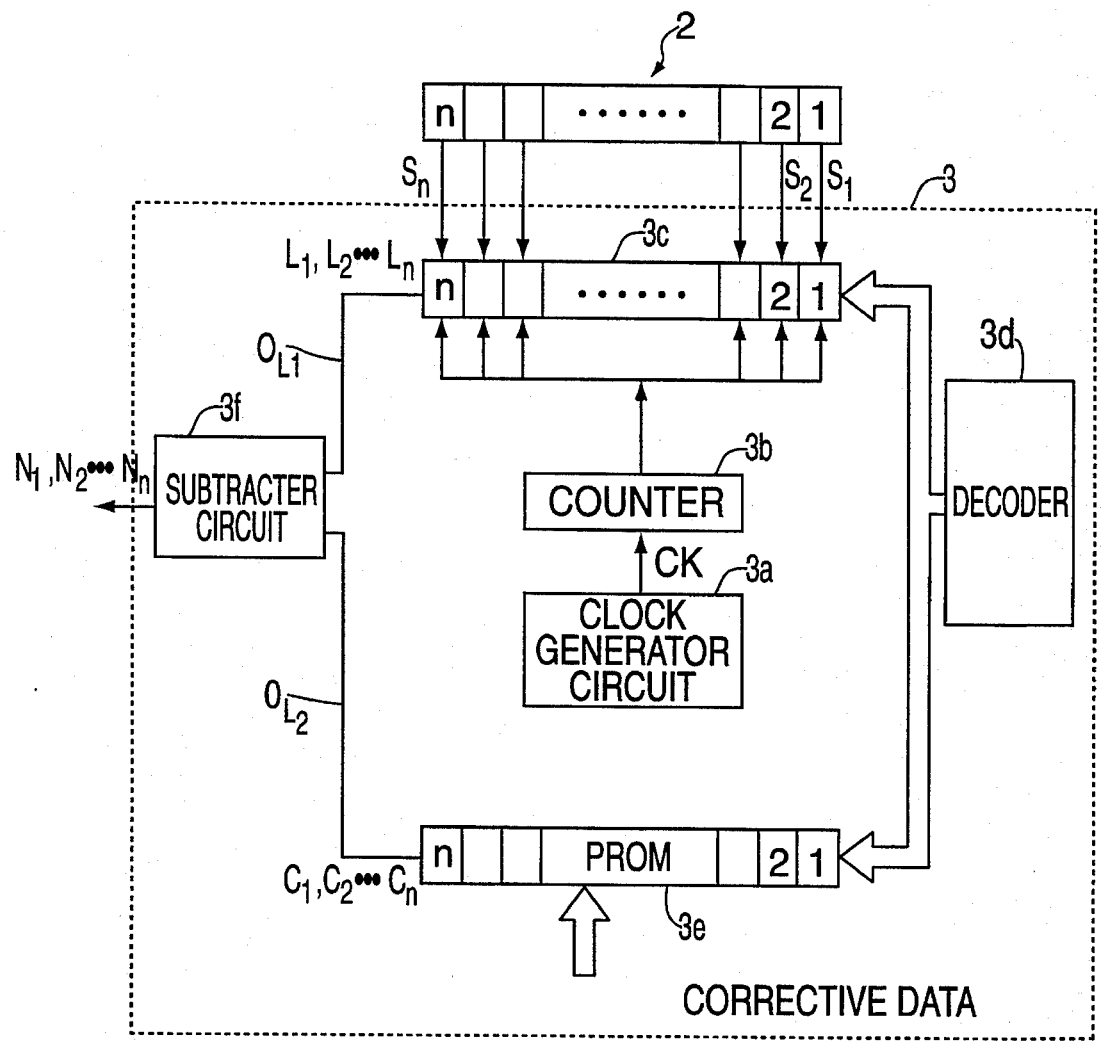
FIG. 6 is a block diagram of a quantizing portion of the prior art IC for autofocus action.
Figure 7:
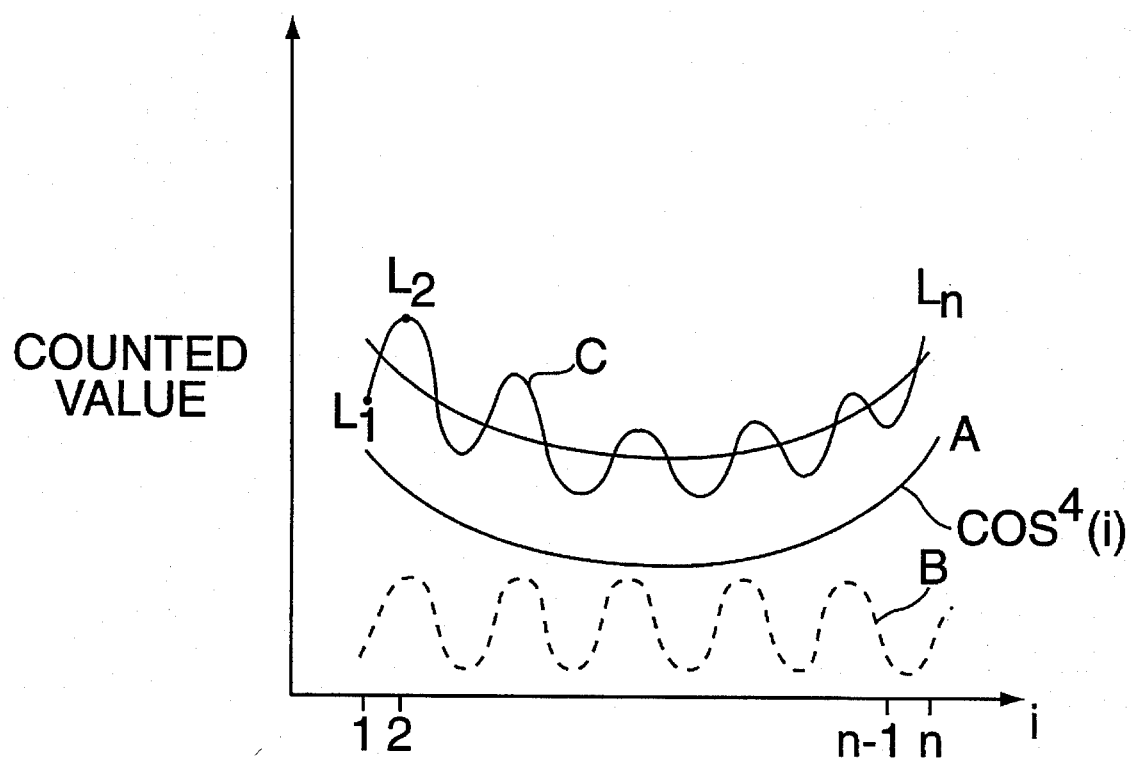
FIG. 7 is a graph illustrating a method of correcting variations in sensor sensitivity in the quantizing portion shown in FIG. 6.

The prior art correcting circuit is composed of the PROM 3e and the subtracter circuit 3f shown in FIG. 6. On the other hand, in the present example, the correcting circuit is composed of the PROM 3e and the adder circuit 3g. The corrective data $C_1$–$C_n$ in the present example are different from data in the prior art techniques. Also, the bits of one data item stored in the PROM 3e have been eliminated.

A method of correcting variations in the sensitivity in the present example is described below. First, after assembly of the range-finding system, each finished product is tested. In each test, the aforementioned blank white test pattern is used as a subject. In the test, counted values $L_1$–$L_n$ are produced from the chip.

Figure 2:
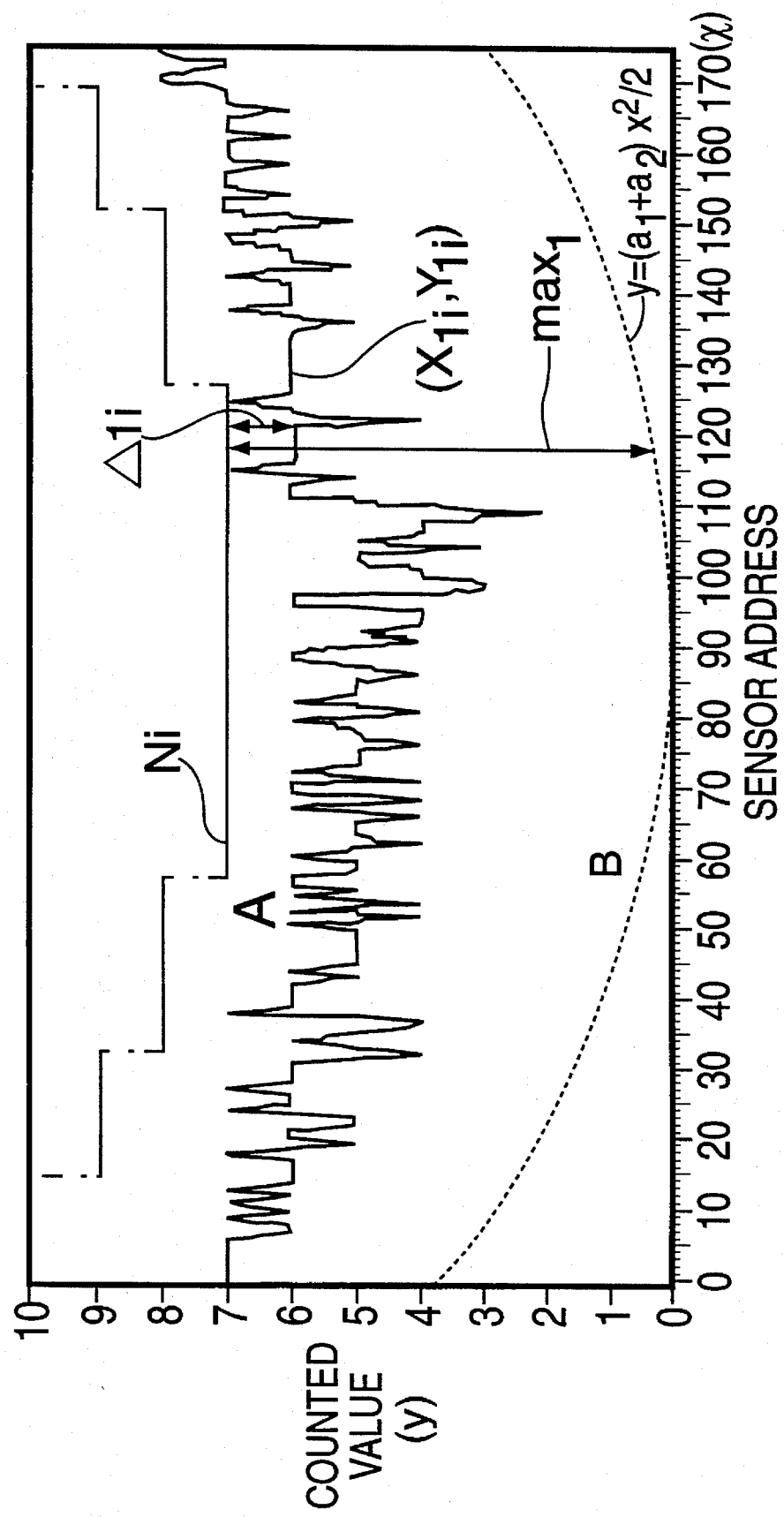
FIG. 2 is a graph illustrating a method of correcting variations in sensor sensitivity in this embodiment.
Figure 3:
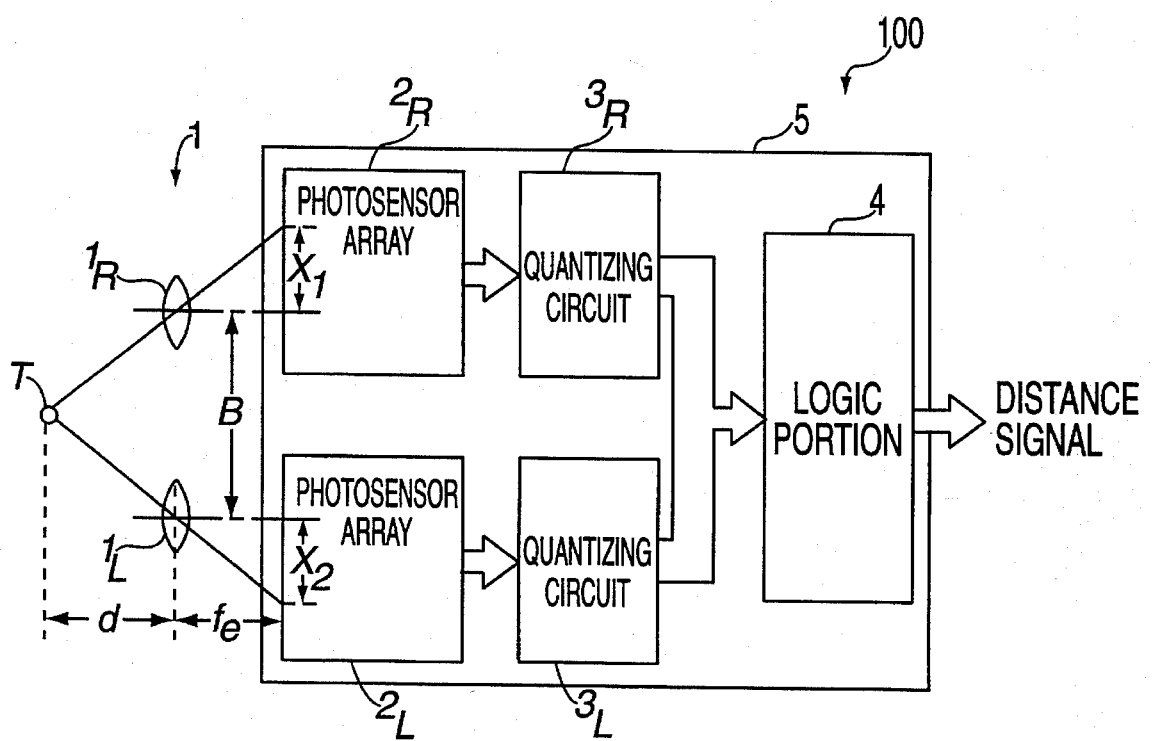
FIG. 3 is a block diagram schematically showing the structure of a range-finding system using triangulation which makes use of light reflected from an object being imaged.
Figure 4:
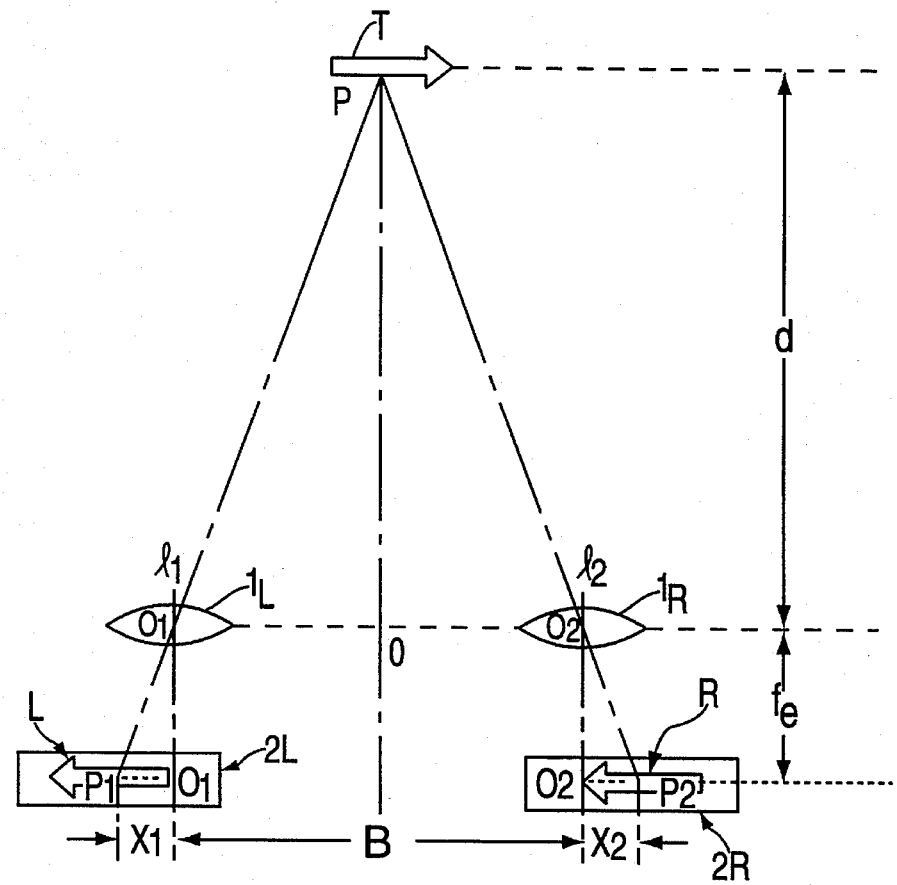
FIG. 4 is a schematic view illustrating the principle of the range-finding system using triangulation which makes use of light reflected from an object.

Referring to FIG. 2, the distribution of counted values $L_1$–$L_n$ in a typical measurement is shown in the solid line A. This distribution is influenced by the focusing lens obeying the $\cos^4$ law and by variations in net sensitivity of the photosensors. In effect, these two phenomena are superimposed.

Let $(x_{1i}, y_{1i})$ be the distributed points. Then, the method of least squares is applied to the distribution A of the counted values $L_1$–$L_n$ in the test to find approximate curves $y=a_1x^2+b_1$, where x is a sensor address, y is a counted value, and $a_1$ and $b_2$ are coefficients. The coefficient $b_1$ corresponds to an offset amount of the sensor. The quantizing circuit begins counting clock pulses CK, in a manner not illustrated, at the beginning of response time $t_s$ when the sensor first produces its output. Thus, the offset amount can be neglected. Thus, an approximate curve $y=a_1x^2$ is obtained. The approximate curve $y=a_1x^2$ generally reflects the state in which variations in net sensitivity of the photosensors are superimposed on the distributions of the focusing lenses obeying the $\cos^4$ law.

Also, the other of the right and left photosensor array also produces distributed points $(x_{2i}, y_{2i})$ and an approximate quadratic curve $y=a_2x^2$. Then, an arithmetical mean $(a_1+a_2)/2$ is computed from the coefficients $a_1$ and $a_2$ of the right and left approximate curves, and an average approximate quadratic curve $y=(a_1+a_2)x^2/2$ is created. This average approximate quadratic curve is indicated by the dotted line B in FIG. 2.

The reason why the neutral average approximate curve is obtained from the approximate curves reflecting the variations in the right and left sensor sensitivities is as follows. The logic portion in the succeeding stage relies on a distance measurement by finding a zone in which right and left focused images agree in correlation. The phase difference between the right and left focused images is found, and the distance is measured. Therefore, the distributions of corrected quantized values need not agree completely. Rather, it is only necessary that a sufficient similarity be detected between the distribution curves. Accordingly, although local or microscopic similarity is not assured, an average curve of the approximate curves is found so that similarity between the outputs of the two sets of sensor addresses is detected. In the past, quantized values have been corrected according to two independent sets of variation-corrected data about the right and left sensors, respectively. Therefore, in the stage preceding the logic portion, correlation is not corrected. In the present example, the correlation between the right and left portions is corrected. Hence, the evaluation of the correlation in the logic portion produces not local correction but coincidence of correlation over a wide zone. In consequence, accurate distance-measuring performance is accomplished.

The average curve B is subtracted from the distributed points $(x_{1i}, y_{1i})$. A rounded value (an integral value) of the differential value $\{y_{1i}-(a_1+a_2)x_{1i}^2/2\}$ is taken as corrective data. However, this is not very effective in reducing the number of bits of data. As can be seen from the difference between A and B in FIG. 2, the differential values can be as high as 8, in which case 4 bits of data storage per address are necessary to accommodate corrective data. Of course, if one does not expect to reduce the number of bits of data, then the aforementioned correlation between the right and left portions will be improved effectively. In this case, the correcting circuit would not use adder circuit 3g. Instead, a subtracter circuit as in the prior art techniques, would be employed.

Accordingly, in the present example, the maximum value $\max_1$ of the differential value $\{y_{1i}-(a_1+a_2)x_{1i}^2/2\}$ is found. The difference between the maximum value $\max_1$ and the differential value is computed to thereby obtain a new differential value $[\max_1-\{y_{1i}-(a_1+a_2)x_{1i}^2/2\}]$. A rounded value of this new differential value is established as corrective data $\Delta_{1i}$. As can be seen from FIG. 2, this corrective data is equal to or less than 3 bit. Thus the storage space in the PROM 3e can be reduced from 4 to 3. Accordingly, the chip size can be reduced.

By corrective data $C_i=\Delta_{1i}$, addition in adder circuit 3g is performed on the counted value $L_i$; rather subtraction, as in the prior art. An adder circuit is simpler, and therefore less costly, than a subtracter circuit. As shown in FIG. 2, the distribution of corrected counted values $N_i$ in a test pattern rises like a staircase on both sides such that the center is the bottom. Corrected counted values arising from the other photosensor array also reveal that a substantially coincident state is obtained even though local disagreements of as much as about 1–2 bits may exist at some sensor addresses. However, a generally good coincidence is been obtained. The distribution of corrected counted values $N_i$ in a test pattern rises like a staircase on both sides because of the $\cos^4$ law. Variations in the net sensor sensitivity should be treated statistically. Since the effect of the $\cos^4$ law is due to the principle error, the use of the method of least squares using the approximate curve $y=a_1 \cos^4 x+b_1$ is better than the use of the method or least squares using the approximate quadratic curve $y=a_1 x^2+b_1$, because the agreement (neglecting the offset amount) between the distributions of corrected counted values obtained from the right and left arrays is made more complete.

The approximate curves are not limited to the two kinds described above. For example, quartic curves may also be used. Furthermore, the method of rounding off coefficients is not restricted to the method of counting fractions of 5 and over as a unit and disregarding the rest. Other rounding methods may also be exploited. In addition, a single quantizing circuit may used by time-sharing by the right and left sensor arrays or by the individual sensors. The quantizing circuit is not limited to the type in which each sensor output is converted into a response time and then quantized. A type in which each sensor output is converted into a voltage and then quantized by a well-known A/D converter may also be used.

As described above, in the present invention, corrective data is stored in corrective data storage means in first and second quantizing portions. The corrective data is added to quantized values of outputs from sensors, for correcting them. Therefore, the invention yields the following advantages.

(1) Sensor output values corresponding to variations in the sensitivity are not directly used as corrective data. Symmetrical corrective data for modifying or shaping the states of distributions of quantized values are used so that quantized value rows from right and left sensor arrays show correlation of greater similarity. Therefore, the number of bits per item of the corrective data can be reduced compared with the number of bits required by the prior art. Hence, the storage space in the corrective data storage means can be reduced. In consequence, the production yield can be enhanced because of a decrease in chip size.

(2) In the quantizing portion located in a stage preceding a logic portion, corrections are made so that the correlation between quantized value rows arising from right and left sensor arrays is increased. Therefore, the evaluation of the correlation made by the logic portion is based, not on local correlation, but instead on correlation agreement over a wide zone. Therefore, accurate distance-measuring performance is realized.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for calculating a correlation between signals from left and right sensor arrays comprising:

producing quantized left outputs from said left sensor array while imaging a blank scene;

producing quantized right outputs from said right sensor array while imaging a blank scene;

approximating said quantized left outputs to produce a left approximate curve of the form $y_1=a_1 x^2+b_1$;

approximating said quantized right outputs to produce a right approximate curve of the form $y_2=a_2 x^2+b_2$;

ignoring coefficients $b_1$ and $b_2$ and calculating coefficients $a_1$ and $a_2$, calculating an average approximation quadratic curve from $(a_1+a_2)x^2/2$;

calculating left differential values between said left quantized values and said average approximation quadratic curve;

calculating right differential values between said right quantized values and said average approximation quadratic curve;

finding a left maximum of said left differential values;

finding a right maximum of said right differential values;

calculating a set of new left differential values by subtracting said left differential values from said left maximum;

calculating a set of new right differential values by subtracting said right differential values from said right maximum;

adding said new left differential values to said quantized left outputs to produce a corrected left sensor array output; and adding said new right differential values to said quantized right outputs to produce a corrected right sensor array output.

2. A method according to claim 1, further comprising correlating said corrected left sensor array output and said corrected right sensor array output to determine a range to an object being imaged.

3. A method for calculating a correlation between signals from left and right sensor arrays comprising:

producing quantized left outputs from said left sensor array while imaging a blank scene;

producing quantized right outputs from said right sensor array while imaging a blank scene;

approximating said quantized left outputs to produce a left approximate curve of the form $y_1=a_1 \cos^4 x+b_1$;

approximating said quantized right outputs to produce a right approximate curve of the form $y_2=a_2 \cos^4 x+b_2$;

ignoring coefficients $b_1$ and $b_2$ and calculating coefficients $a_1$ and $a_2$, calculating an average approximation curve from $(a_1+a_2) \cos^4 x/2$;

calculating first differential values between said left quantized values and said average approximation curve;

calculating right differential values between said right quantized values and said average approximation curve;

finding a left maximum of said left differential values;

finding a right maximum of said right differential values;

calculating a set of new left differential values by subtracting said left differential values from said left maximum;

calculating a set of new right differential values by subtracting said right differential values from said right maximum;

adding said new left differential values to said quantized left outputs to produce a corrected left sensor array output; and adding said new right differential values to said quantized right outputs to produce a corrected right sensor array output.

4. A method according to claim 3, further comprising correlating said corrected left sensor array output and said corrected right sensor array output to determine a range to an object being imaged.

5. A method for calculating a correlation between signals from first and second sensor arrays comprising:

producing quantized first outputs from said first sensor array while imaging a blank scene;

producing quantized second outputs from said second sensor array while imaging a blank scene;

approximating said quantized first outputs to produce a first approximate curve of the form $y_1 = a_1 x^2 + b_1$;

approximating said quantized second outputs to produce a second approximate curve of the form $y_2 = a_2 x^2 + b_2$;

ignoring coefficients $b_1$ and $b_2$ and calculating coefficients $a_1$ and $a_2$, calculating an average approximation quadratic curve from $(a_1+a_2)x^2/2$;

calculating first differential values between said first quantized values and said average approximation quadratic curve;

calculating second differential values between said second quantized values and said average approximation quadratic curve;

finding a first maximum of said first differential values;

finding a second maximum of said second differential values;

calculating a set of new first differential values by subtracting said first differential values from said first maximum;

calculating a set of new second differential values by subtracting said second differential values from said second maximum;

adding said new first differential values to said quantized first outputs to produce a corrected first sensor array output; and adding said new second differential values to said quantized second outputs to produce a corrected second sensor array output.

6. A method according to claim 5, further comprising correlating said corrected first sensor array output and said corrected second sensor array output to determine a range to an object being imaged.

7. A method for calculating a correlation between signals from first and second sensor arrays comprising:

producing quantized first outputs from said first sensor array while imaging a blank scene;

producing quantized second outputs from said second sensor array while imaging a blank scene;

approximating said quantized first outputs to produce a first approximate curve of the form $y_1 = a_1 \cos^4 x + b_1$;

approximating said quantized second outputs to produce a second approximate curve of the from $y_2 = a_2 \cos^4 x + b_2$;

ignoring coefficients $b_1$ and $b_2$ and calculating coefficients $a_1$ and $a_2$, calculating an average approximation curve from $(a_1+a_2) \cos^4 x/2$;

calculating first differential values between said first quantized values and said average approximation curve;

calculating second differential values between said second quantized values and said average approximation curve;

finding a first maximum of said first differential values;

finding a second maximum of said second differential values;

calculating a set of new first differential values by subtracting said first differential values from said first maximum;

calculating a set of new second differential values by subtracting said second differential values from said second, maximum;

adding said new first differential values to said quantized first outputs to produce a corrected first sensor array output; and adding said new second differential values to said quantized second outputs to produce a corrected second sensor array output.

8. A method according to claim 7, further comprising correlating said corrected first sensor array output and said corrected second sensor array output to determine a range to an object being imaged.

\* \* \* \* \*